United States Patent [19]
Shaham et al.

[11] Patent Number: 6,044,149
[45] Date of Patent: Mar. 28, 2000

[54] DEVICE FOR DETECTING DTMF TONES

[76] Inventors: Israel Shaham, 49 Reiness Street, Givatayim; Amos Shaham, 10 Hazait Street, Even Yehuda 40500, both of Israel

[21] Appl. No.: 08/811,877

[22] Filed: Mar. 5, 1997

[51] Int. Cl.[7] ................................................ H04M 3/22
[52] U.S. Cl. .......................... 379/377; 379/382; 379/413
[58] Field of Search .................................. 379/386, 377, 379/382, 350, 413, 156, 164, 251, 253, 324, 282, 283

[56] References Cited

U.S. PATENT DOCUMENTS

| | | | |
|---|---|---|---|
| 4,256,928 | 3/1981 | Lesea et al. ............................ | 379/214 |
| 4,304,968 | 12/1981 | Klausner et al. ...................... | 379/370 |
| 4,408,102 | 10/1983 | Lumpkin ............................ | 379/101.01 |
| 4,491,690 | 1/1985 | Daley ................................. | 379/102.01 |
| 4,528,424 | 7/1985 | Middleton et al. .................... | 379/183 |
| 4,570,034 | 2/1986 | Serrano .................................. | 379/373 |
| 4,675,899 | 6/1987 | Ahuja .................................... | 379/387 |
| 4,742,538 | 5/1988 | Szlam .................................... | 379/361 |
| 4,811,381 | 3/1989 | Woo et al. ............................. | 379/67 |
| 4,850,008 | 7/1989 | Berg et al. ............................ | 379/373 |
| 4,860,340 | 8/1989 | Suzuki et al. . | |
| 4,893,334 | 1/1990 | Parnello . | |
| 5,131,031 | 7/1992 | Waldman . | |
| 5,163,050 | 11/1992 | Cromack . | |
| 5,172,406 | 12/1992 | Locke . | |
| 5,333,152 | 7/1994 | Wilber ................................... | 379/373 |
| 5,388,153 | 2/1995 | Burger et al. ......................... | 379/165 |
| 5,502,762 | 3/1996 | Andrew et al. ....................... | 379/202 |
| 5,706,342 | 1/1998 | Baeder et al. ........................ | 379/382 |

FOREIGN PATENT DOCUMENTS 10443  1/1996  Israel .

OTHER PUBLICATIONS

Brochure: *Ring*MATE the mini switchboard for home and office, (Sep. 19, 1994).
Brochure: RingMate, Bindal Telecommunications Electronics–Telephones, (Jun. 1995).
Brochure: Be In Control Smooth Talking with Contact1, (1988).
Brochure: Pager, ORANUS Technological Methods Ltd., (Jan. 1996).
Brochure: Sel–Phone System, (Jan. 1995).
Brochure: *EasyLink*, (Jun. 1995).
Brochure: BUZZIT, dated Sep. 1995.
Operational Amplifiers/Buffers LM101/LM102,.

*Primary Examiner*—Forester W. Isen
*Assistant Examiner*—Jacques M. Saint-Surin
*Attorney, Agent, or Firm*—Foley & Lardner

[57] ABSTRACT

A self-contained signaling and control device for detecting DTMF tones and generating a signal, such as an audible, visual, or control signal, upon detection of one or more predetermined DTMF tones includes an on/off-hook detection circuit coupled to a telephone line; a power supply circuit coupled to the on/off-hook detection circuit; a DTMF receiver circuit coupled to the power supply circuit; a logic circuit coupled to the DTMF receiver circuit; and a signal generator coupled to the logic circuit and the power supply circuit. The on/off hook detector circuit for detecting changes in voltage across a telephone line includes a circuit for detecting a voltage on the telephone line and a circuit for generating an enable signal in response to rapid changes in the voltage on the telephone line. The on/off hook detector circuit does not generate an enable signal in response to slow changes in the voltage on the telephone line.

6 Claims, 2 Drawing Sheets

DEVICE FOR DETECTING DTMF TONES

BACKGROUND OF THE INVENTION

1. Field of the Invention

The present invention relates to a self-contained signaling and control device for detecting telephone dual-tone multi-frequency (DTMF) tones and generating a signal upon detection of a DTMF tones sequence that matches a preset sequence as a code. The signal may be, for example, an audible signal, a visual signal or a control signal to drive an auxiliary device.

2. Description of Related Art

Homes, offices and other places often have several telephones which are connected in different locations to a single telephone line. Where a private telephone exchange is not involved, there is the problem of "call transfer." For example, a first user who picks up the phone to receive a call and wants to "transfer" the call to a second user must, e.g., shout to the second user or go to the location of the second user to tell the second user to pick up the phone.

To address this situation, there are a variety of known signaling devices designed to signal from one telephone location to another. For example, there are private telephone exchanges that have signaling as well as many additional features. There are also other devices which differ from each other by various features, such as the intended use thereof or the operating method and components. However, these devices require an external current supply to operate, necessitating a power source such as a battery.

SUMMARY OF THE INVENTION

In view of the above-described drawbacks of known signaling devices, the present invention provides a self-contained signaling and control device for detecting DTMF tones and generating a signal, such as an audible, visual, or control signal, upon detection of one or more predetermined DTMF tones.

According to the present invention, an electronic assembly is mounted within a housing. The housing contains, inter alia, a power supply circuit, on/off-hook detection means, a DTMF receiver, a logic circuitry and a signal generator. The assembly may also include a control device to control the output of the signal generator and a selection device to pre-select a tones sequence.

In a preferred embodiment of the invention, several devices according to the invention are connected to the house telephone line or to any pair of signal lines. When one of the telephones on the line is taken off-hook, dialing a sequence of tones will generate a notice signal at the device which was preset to respond to such a sequence of tones for "call transfer" or for any other signaling/warning purpose. The activation of the device by dialing a sequence of tones can be executed either from each of the telephones connected directly to the house-line or from other telephones connected directly to the house-line via the telephone central office.

An on/off hook detector circuit for detecting changes in voltage across a telephone line according to the present invention includes a circuit for detecting a voltage on the telephone line and a circuit for generating an enable signal in response to rapid changes in the voltage on the telephone line. The on/off hook detector circuit does not generate an enable signal in response to slow changes in the voltage on the telephone line.

A device for detecting DTMF tones according to the present invention includes an on/off-hook detection circuit coupled to a telephone line; a power supply circuit coupled to the on/off-hook detection circuit; a DTMF receiver circuit coupled to the power supply circuit; a logic circuit coupled to the DTMF receiver circuit; and a signal generator coupled to the logic circuit and the power supply circuit.

A method for detecting DTMF tones according to the present invention includes the steps of detecting a voltage on a telephone line; and generating an enable signal only upon detection of rapid changes in the voltage on the telephone line. The enable signal is generated in response to an on-hook to off-hook line voltage change.

The device according to the present invention enables the codes to be a combination from all the available signals used by telephones (i.e., the digits 0, 1 . . . 9, and the "*" and "#" signs) and operates during both outgoing and incoming calls. The device also derives all of its power from the telephone line such that no auxiliary power source or battery is needed. Moreover, installation of the device according to the present invention is easy and convenient. It can be hooked onto an available telephone outlet as well as in series to the line connecting the outlet to the telephone. Thus, the device according to the present invention provides a low-cost, easy-to-operate solution to an existing problem.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

DETAILED DESCRIPTION OF THE INVENTION

The present invention will now be described in detail with reference to the accompanying drawings. For convenience, the present invention will be illustrated with reference to a home telephone line where several phones are connected to the line and each is located in a different room. In each room, a single device is connected to the telephone line. In a preferred embodiment of the invention, two standard connectors are available on the device such that the telephone cord is plugged into one connector, and the line cord is plugged into the second connector. Also, connection of the device to the line is satisfied with using either one of the two connectors. However, this description is for illustrative purposes only and does not limit the applicability of the present invention in any way.

Figure 1:
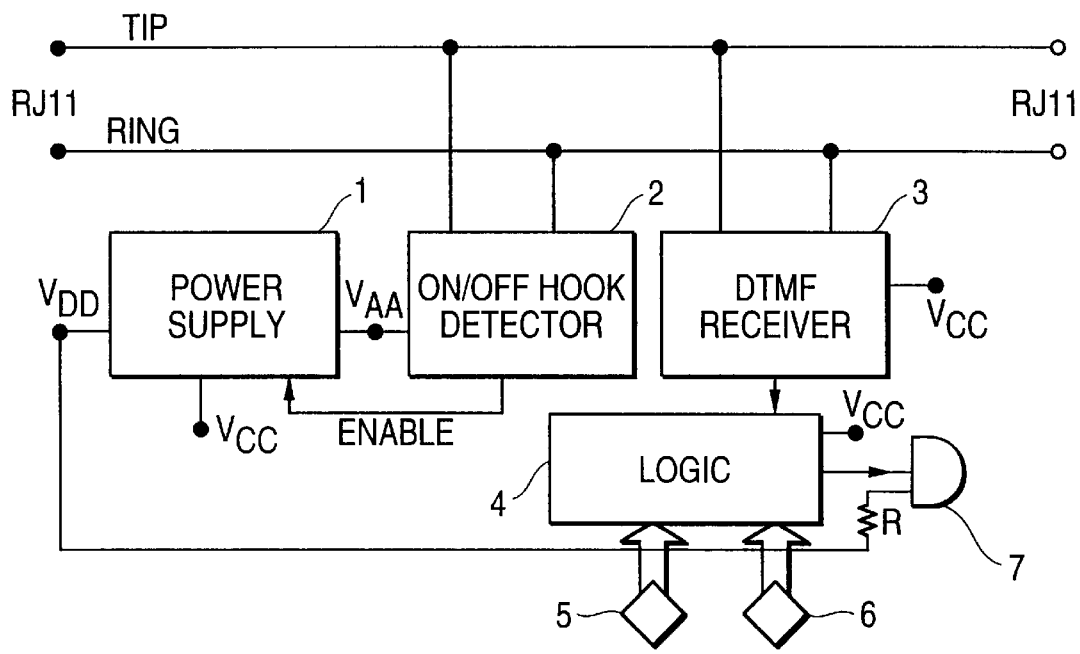
FIG. 1 provides an illustration of a device for detecting DTMF tones according to the present invention, including a power supply circuit, an on/off hook detector circuit, a DTMF receiver circuit, and a logic circuit.

As shown in FIG. 1, a device for detecting DTMF tones according to the present invention includes a power supply circuit 1, an on/off hook detector (HD) circuit 2, a DTMF receiver circuit 3, and a logic circuit 4. A signal generator 7, e.g., a buzzer, is also provided. The power supply 1, HD circuit 2, DTMF receiver circuit 3, logic circuit 4 and the signal generator 7 may be conventional circuits or integrated circuit (IC) chips.

With reference to FIG. 1, the HD circuit 2 and the DTMF receiver circuit 3 are coupled to a standard telephone line, e.g., a two-wire telephone line (having a "ring" wire and a "tip" wire coming from a central office of the telephone system) coupled via a standard RJ11 telephone plug/jack configuration. The voltage across the ring and tip wires is designated as $V_L$.

The power supply circuit 1 generates voltages such as $V_{CC}$, $V_{AA}$ and $V_{DD}$ to operate the circuits of the device. For example, the DTMF receiver circuit 3 and the logic circuit 4 may be coupled to DC voltage source $V_{CC}$. The HD circuit 2 may be coupled to DC voltage source $V_{AA}$, and the signal generator 7 may be coupled to DC source $V_{DD}$.

Figure 3:
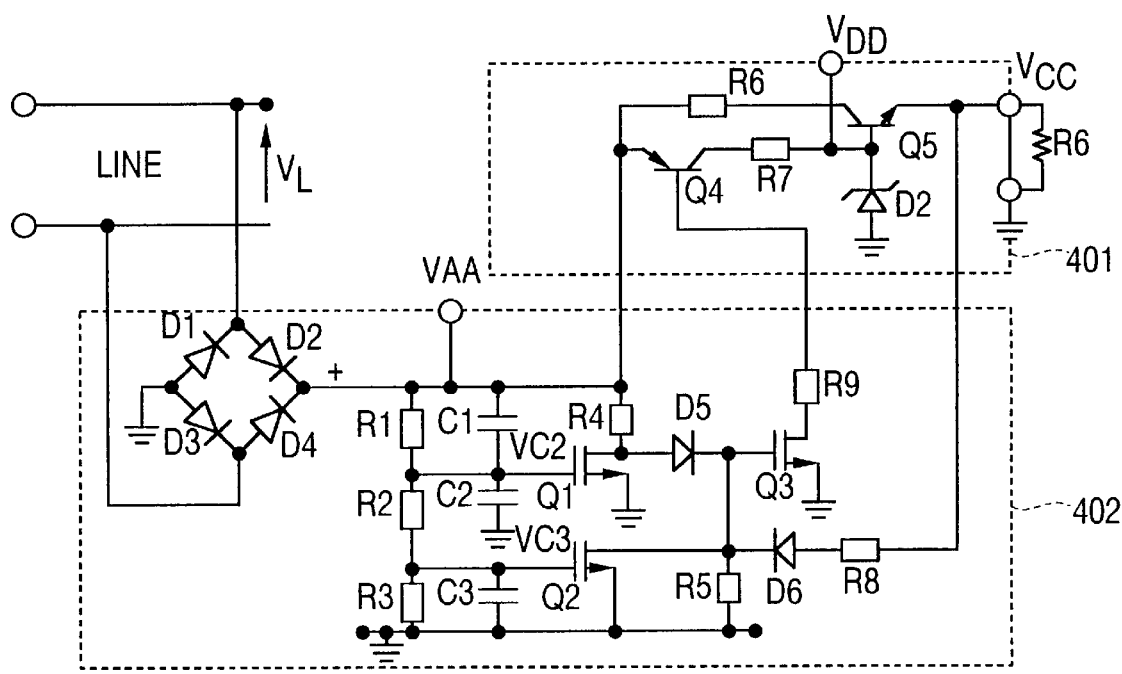
FIG. 3 provides a detailed schematic diagram of the on-off hook detector circuit and the power supply circuit of FIG. 1.

FIG. 3 provides a detailed schematic diagram of the components of a power supply circuit 1 and an HD circuit 2 for use in the device of FIG. 1. The components of the power supply circuit 1 are shown in box 401, and the components of the HD circuit 2 are shown in box 402. As shown in box 402 of FIG. 3, the HD circuit 2 may include diodes D1, D2, D3, D4, D5 and D6; resistors R1, R2, R3, R4, R5, R8 and R9; capacitors C1, C2 and C3; and transistors Q1, Q2 and Q3. As shown in box 401 of FIG. 3, the power supply circuit 1 includes a Zener diode Dz; resistors R6, R7 and $R_L$; and transistors Q4 and Q5.

The HD circuit 2 as shown in box 402 operates as follows. In its initial state, the line voltage $V_L$ is, for example, 50 V. Diodes D1, D2, D3 and D4 perform a full bridge rectification of $V_L$, thereby setting $V_{AA}$ to +50 V (in reference to circuit ground). R1, R2 and R3 are selected so that Q1 and Q2 are in an "ON" state of operation, thereby providing a path to ground. When Q2 is "ON", Q3 is "OFF", thus disabling Q4 from conducting and disconnecting the power supply circuit 1 shown in box 401.

The values of C1, C2, C3, R1, R2 and R3 are selected such that when $V_L$ changes from 50 V to 0 V slowly (e.g., over a period of more than a few seconds), $V_{AA}$ and the voltage across C1, C2 and C3 will follow the change. At high $V_{AA}$ voltages, Q1 and Q2 remain in an "ON" state, while Q3 is "OFF". This is the "disable" mode of the HD circuit 2. As $V_L$ (and $V_{AA}$) slowly drops, at a certain voltage Q2 will also be turned "OFF" while Q1 remains "ON". Q3 remains "OFF" due to the effect of R5, and the HD circuit 2 remains in disable mode. As $V_L$ (and $V_{AA}$) continues to slowly drop, Q1 is also turned "OFF". However, at these voltages R4 and R5 are selected to maintain Q3 in an "OFF" state, such that the HD circuit 2 remains in disable mode.

When $V_L$ changes rapidly (e.g., indicating that a telephone has been taken off the hook), the voltages across C1, C2 and C3 are maintained as set by R1, R2 and R3 and the on-hook voltage $V_L$ (approx. 50 V). Thus, when $V_L$ drops rapidly (for example, in less than 100 msec) from 50 V to 10 V, C1, C2 and C3 do not follow this change in voltage, resulting in $V_{AA}$ being higher than $V_L$. This situation causes a reverse voltage on diodes D1, D2, D3 and D4, thus isolating $V_{AA}$ from $V_L$. $V_{AA}$ becomes a function of C1, C2 and C3 discharging via R1, R2 and R3. In that instant, the state of Q1 is determined by the voltage $V_{C2}$ across capacitor C2 and the discharge rate $T_{C2}$ of C2 and C3 via R2 and R3. At the same time, C1 discharges via R1 at a rate of $T_{C1}$. $T_{C1}$ is selected to be longer than $T_{C2}$ in order to insure than $V_{AA}$ remains at a higher level than $V_L$. While $V_{AA}$ remains higher than $V_L$, C2 is discharged to the point where Q1 and Q2 are turned "OFF". When Q1 and Q2 are turned "OFF", Q3 is turned "ON". When Q3 is "ON", it enables the power supply circuit 1 shown in box 401. The power supply circuit 1 in turn provides DC voltage output $V_{CC}$. $V_{CC}$ latches Q3 to its "enable" state via R8 and D6.

Q3 remains latched in an "ON" state and $V_{CC}$ is supplied by the power supply circuit 1 as long as $V_L$ remains low (in the off-the-hook state). When $V_L$ rises to the on-hook state, at a selected value of $V_{AA}$ (as determined by R3/R1+R2+R3) Q2 is turned "ON". As a result, Q3 is turned "OFF" and the power supply circuit 1 is disabled (no longer generates $V_{CC}$). According to one embodiment, Q2 is turned "OFF" when $V_L$ reaches a level of 20 V.

Figure 2:
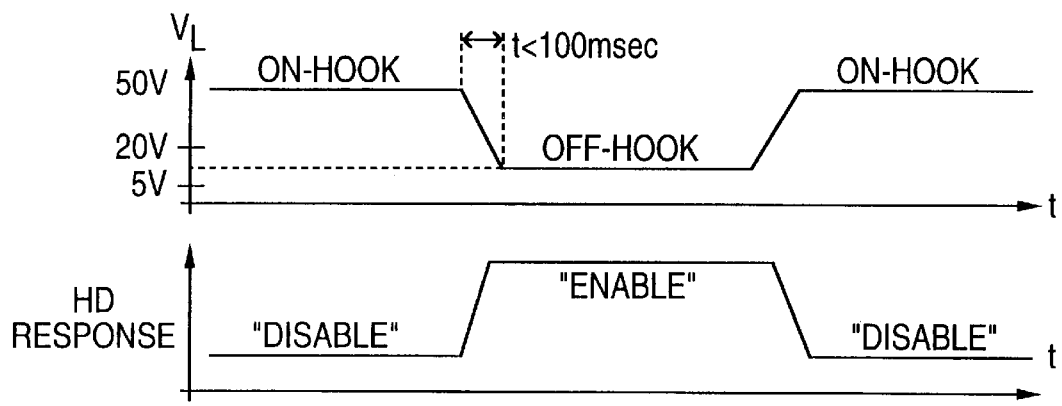
FIG. 2 provides a diagram of the response of the on/off hook detector circuit of FIG. 1 to relatively rapid changes in the voltage across the telephone lines.

The behavior of the HD circuit 2 in response to relatively rapid changes of $V_L$ is illustrated in FIG. 2.

With reference to FIG. 1, the DTMF receiver circuit 3 may be, for example, a standard integrated circuit (IC) such as a model MT 8870 manufactured by Mitel. This standard DTMF receiver IC may be coupled to a standard encoder IC such as a model 74HC238 manufactured by Philips and other companies for encoding the received DTMF signals and providing the encoded signals to the logic circuit 4.

The logic circuit 4 may be, for example, constructed from standard ICs such as a models 74HC132 and 74HC74 chips manufactured by Philips and other companies.

Both the DTMF receiver circuit 3 and the logic circuit 4 may also be provided by customized logic ASICS which perform the functions of these circuits as described in this specification.

The operation of the device for detecting DTMF tones of FIG. 1 will now be described in detail.

Prior to installation of the devices, the user selects a code for each unit by programming the logic circuit 4 of each device. Code selection for the device may be accomplished by various hardwired techniques such as a code selection button 6 or other mechanism (internal jumpers, rotary switches or thumb wheel switches, etc.). The logic circuit 4 of each device may also be programmed directly from the telephone, via the telephone line, in a similar procedure as the programming of a telephone dial memory.

The codes that may be selected for each device are a combination of the available signs used by telephones, i.e., 0, 1 ... 9, #, *. The combination codes that are to be selected should not interfere with other telephone usages. Normally two or three sign codes will be used. For example, ##3 or #12. An additional "call-all" code (such as ###) is factory set for each device. Dialing the call-all code will cause all devices to respond independently of their unique code.

The device of FIG. 1 has three modes of operation:
 (a) "Sleep"—When all the telephones connected to the line are on-hook, the device is on-hooked as well.
 (b) "Stand-By"—When at least one telephone is off-hook, the device is powered and ready to detect the DTMF signals.
 (c) "Operate"—Upon detection of its code or the "call-all" code, the device generates a signal.

The device may optionally include an indication means (not shown) such as an LED display to indicate its current state of operation, assist in code sequence set-up, and perform other appropriate display operations.

In the sleep mode of operation, the HD circuit 2 detects the on-hook situation based upon the voltage across the telephone lines (e.g., approximately 50 V) and deactivates the power supply circuit 1 as discussed above with reference to FIG. 3. Thus, no power is provided to the other circuits of the device.

When at least one telephone on the line is taken off the hook, the telephone line voltage drops from 50 V to a substantially lower voltage (normally less than 12 V, depending on the external telephone lines and the type of the exchange). Once the HD circuit 2 detects an off-hook situation based upon the substantial drop in voltage across the telephone line, the device switches to the stand-by mode in which the power supply circuit 1 provides DC voltages to the other circuits of the device as described above with reference to FIG. 3. The DTMF receiver 3 is then active and ready to receive DTMF signals.

Upon receipt of a DTMF signal (e.g., a code dialed by a user of the telephone who wants to notify a second user to pick up the phone), the DTMF receiver circuit 3 encodes the DTMF signal and passes it to the logic circuit 4 for comparison with the code selection setting programmed into the logic circuit as described above. When the dialed DTMF sequence matches the preset selected code, the logic circuit 4 transmits a signal to the signal generator 7 which generates a signal, e.g., an audible, visual, or control signal. The duration of the signal may be set by the user via a setting input device 5 to suit the user environment.

Control signals generated by the signal generator 7 may be, for example, signals to initiate operation of in-home devices such as facsimile machines, modems, computers, air conditioners, garage doors and other electronic devices and systems within the home or office.

In order to confirm that the signal was generated, the signal generated by generator 7 is fed back to the line via the power supply circuit 1 so that the first user also receives the signal. For example, if a buzzer is used as signal generator 7, a buzz feedback signal is parasitically coupled to the line as a result of the buzzing electrical current, causing a change to its supply voltage ($V_{DD}$ and $V_{AA}$) which reflects into the telephone line ($V_L$). This small change in $V_L$ is received by the other telephones in the same way as voice is received.

Calling several devices connected to the line may be accomplished by dialing their codes in sequence. Calling all devices at once may be accomplished by dialing the call-all code sequence.

While the present invention has been particularly described with reference to the preferred embodiments, it should be readily apparent to those of ordinary skill in the art that changes and modifications in form and details may be made without departing from the spirit and scope of the invention. It is intended that the appended claims include such changes and modifications.

What is claimed is:

1. A device adapted to be coupled to a telephone line for detecting DTMF tones on the telephone line when the telephone line is in an off-hook condition, and generating a signal in response to at least one predetermined set of DTMF tones, the device comprising:

an on/off-hook detection circuit for detecting, but not changing, the on/off-hook condition of the telephone line;

a power supply circuit coupled to said on/off-hook detection circuit and activated by said on/off-hook detection circuit only when said on/off-hook detection circuit detects an off-hook condition of the telephone line;

a DTMF receiver circuit coupled to and activated by said power supply circuit;

a signal generator coupled to said power supply circuit; and a logic circuit coupled to said DTMF receiver circuit and said signal generator for activating said signal generator upon detection of said at least one predetermined set of DTMF tones.

2. A device according to claim 1, wherein said DTMF receiver circuit further comprises an encoder for encoding received DTMF tones and providing said encoded DTMF tones to said logic circuit.

3. A device according to claim 1, wherein said signal generator generates an audible signal corresponding to a tone code received by said DTMF receiver circuit.

4. A device according to claim 1, wherein said signal generator generates a visible signal corresponding to a tone code received by said DTMF receiver circuit.

5. A device according to claim 1, wherein said signal generator generates a control signal for initiating operation of an external device.

6. A device according to claim 1, wherein said device for detecting DTMF tones operates using voltage from the telephone line and does not require an external power source.

* * * * *